(No Model.) 3 Sheets—Sheet 1.

H. BOLTHOFF.
BRAKE MECHANISM.

No. 494,518. Patented Mar. 28, 1893.

WITNESSES:
G. J. Rollanaic
Wm. McConnell

INVENTOR
Henry Bolthoff
BY
A. J. O'Brien
ATTORNEY.

(No Model.) 3 Sheets—Sheet 2.
H. BOLTHOFF.
BRAKE MECHANISM.
No. 494,518. Patented Mar. 28, 1893.
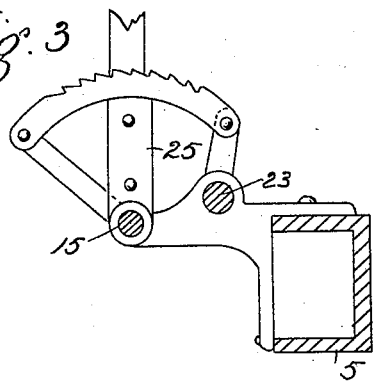
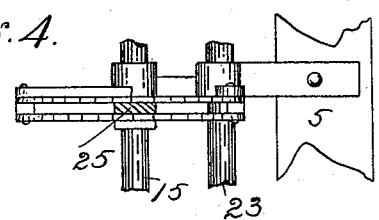
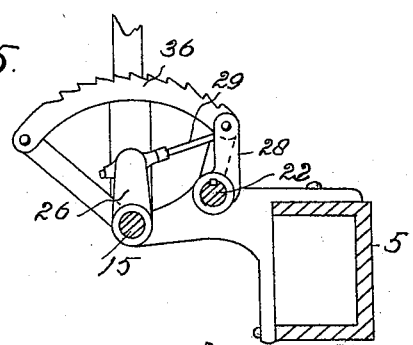
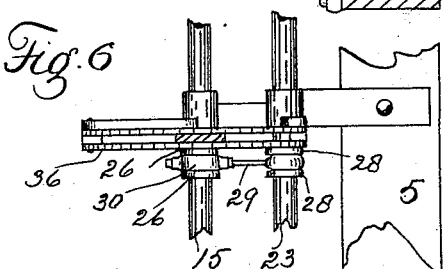
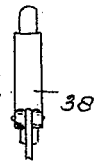
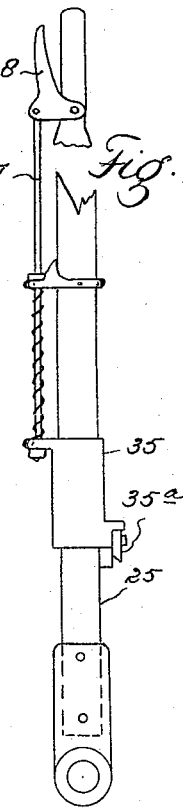
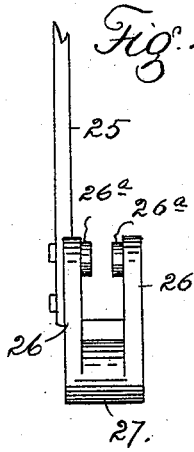
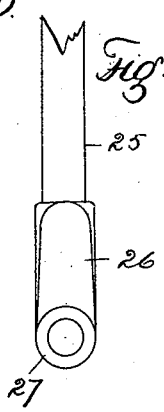
WITNESSES:
INVENTOR
Henry Bolthoff
BY
ATTORNEY.

(No Model.)   3 Sheets—Sheet 3
H. BOLTHOFF.
BRAKE MECHANISM.
No. 494,518.   Patented Mar. 28, 1893.
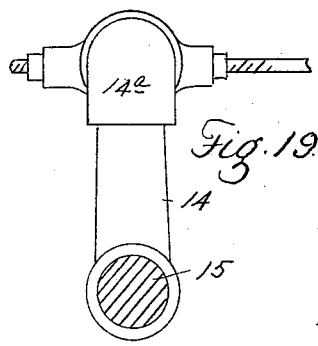
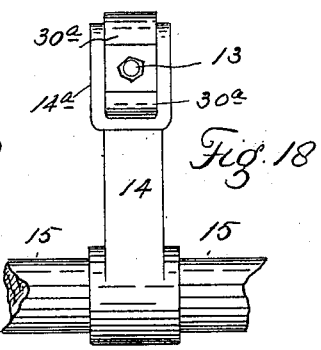
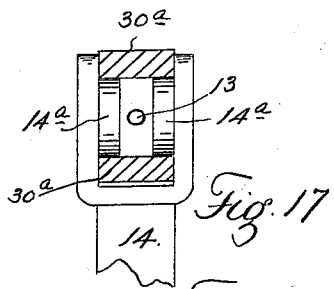
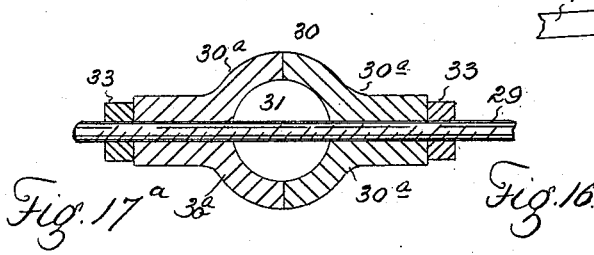
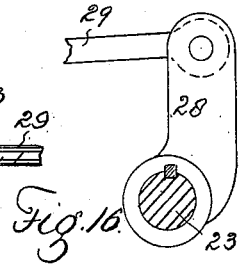
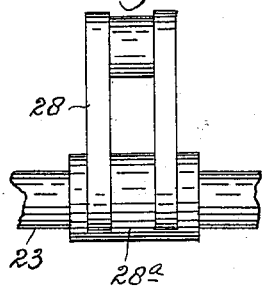
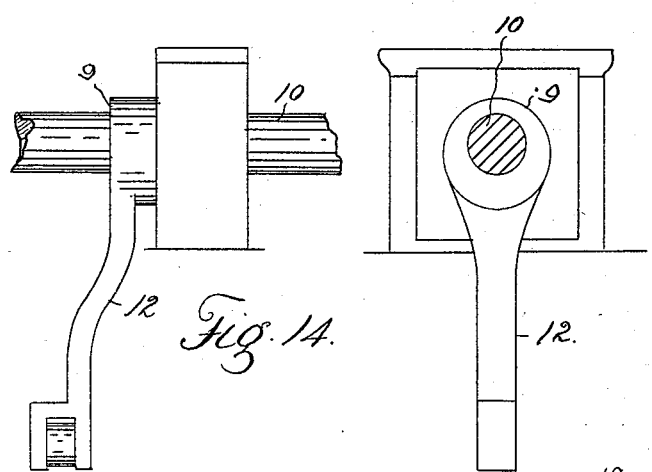
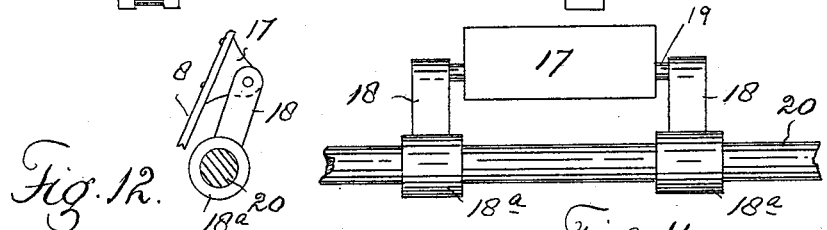
WITNESSES:
INVENTOR
Henry Bolthoff
BY
A. J. O'Brien
ATTORNEY.

UNITED STATES PATENT OFFICE.

HENRY BOLTHOFF, OF DENVER, COLORADO.

BRAKE MECHANISM.

SPECIFICATION forming part of Letters Patent No. 494,518, dated March 28, 1893.

Application filed May 9, 1892. Serial No. 432,374. (No model.)

*To all whom it may concern:*

Be it known that I, HENRY BOLTHOFF, a citizen of the United States of America, residing at Denver, in the county of Arapahoe and State of Colorado, have invented certain new and useful Improvements in Brake Mechanism for Hoisting-Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.
My invention relates to improvements in brake mechanism specially designed for hoisting engines, but which may be employed to equal advantage in connection with other machinery so constructed as to utilize a strap brake.

The object of the invention is to apply the brake in such a manner as to increase the efficiency.

To this end the improvement consists of the features, arrangements and combinations hereinafter described and claimed.

Figure 1:
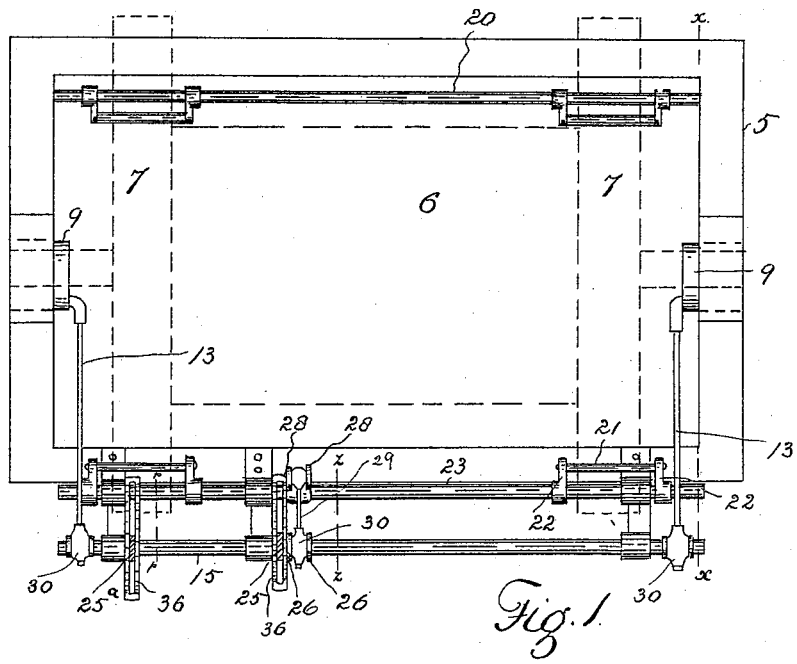
Figure 2:
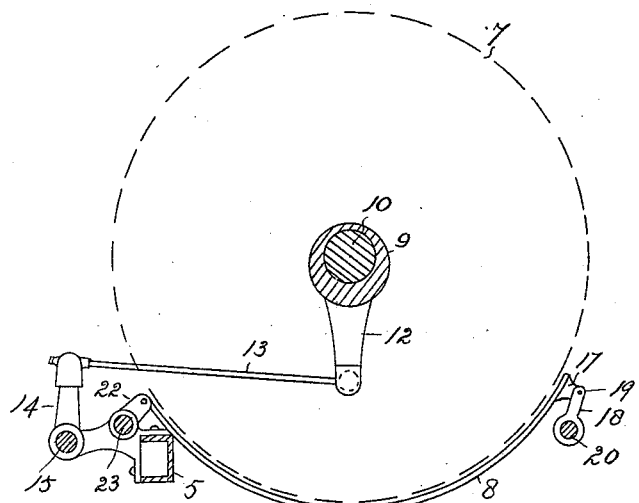

The mechanism will be fully understood by reference to the accompanying drawings, in which is illustrated an embodiment thereof.
In the drawings:—Figure 1 is a top view of a hoisting drum showing the application of my improvement; the drum being shown in dotted lines. Fig. 2 is an enlarged vertical section taken on line $x-x$, Fig. 1. Fig. 3 is a section taken on line $p-p$, Fig. 1. Fig. 4 is a top view of the mechanism shown in Fig. 3. Fig. 5 is an enlarged section taken on line $z-z$, Fig. 1. Fig. 6 is a top view of the mechanism shown in Fig. 5. Figs. 7 and 8 are side and edge views respectively of the operating lever. Figs. 9 and 10 illustrate a modified form of construction for the base of the lever. Fig. 11 is a top view of the toggle joint with which one extremity of the brake is connected. Fig. 12 is a side view of the same showing the shaft in section. Figs. 13 and 14 illustrate the manner of changing the center drum for the purpose of throwing the same in and out of gear. Figs. 15, 16, 17, 17$^a$ 18, and 19 illustrate details of construction.

Similar reference characters indicating corresponding parts or elements of the mechanism, let the numeral 5 designate the framework upon which is mounted the hoisting drum 6, shown in dotted lines, and provided with the circumferential end flanges 7, to which the brake straps 8 are attached. The spindles 10 of the drum are eccentrically mounted in collars 9 to which are secured the depending crank arms 12. To the lower extremity of each of these arms is pivoted one extremity of a pitman 13, the opposite extremity of each pitman being suitably connected with a crank arm 14 rigidly secured to a shaft 15 journaled in the framework and rocked by a lever 25$^a$. This mechanism is designed to change the location of the drum's center for the purpose of connecting the drum flanges with their actuating friction pulleys, and at the same time changing the location of the flanges with reference to the brake straps. These straps are two in number, one for each flange 7. Each strap is connected at one extremity with a joint composed of arms 17 and 18 pivoted at 19. The brake strap is directly connected with arm 17 of the joint, while arms 18 are movably supported upon a shaft 20 mounted upon the frame. Each arm 18 is provided with a collar 18$^a$ surrounding the shaft. As shown in the drawings there are two arms 18 connected by pin 19 upon which arm 17 is pivoted (Figs. 1 and 11). In this event arm 17 is of a width about equal to the width of the brake strap, thus affording ample surface for the attachment of the brake extremity. The opposite extremity of each brake strap is attached to a pin 21 connecting the extremities of arms 22 rigidly secured to a shaft 23 movably mounted upon the frame. The brake is applied through the medium of a lever 25 secured at its lower extremity to a pair of crank arms 26 connected by a collar 27 movably mounted upon shaft 15. Arms 26 are connected with another pair of arms 28 by means of a short pitman or connecting rod 29 having its extremities suitably connected with the two sets of arms. Arms 28 are locked upon the shaft 23 at their lower extremities, which are connected by a sleeve 28$^a$, their upper extremities being pivoted to the rod in any suitable manner. Arms 26 are connected with the rod 29 by a two part socket 30 composed of the sections 30$^a$, 30$^a$, having inner concave-extremities, and their outer extremities apertured to receive rod 29. Their inner extremities form a recess 31, through the center of which the connecting rod passes. Recess 31 is provided with opposite openings for the reception of wrists 26ª formed upon the upper extremities of the arms and occupying positions on opposite sides of rod 29. Sections 30ª of this joint move freely upon rod 29, which is threaded to receive adjusting nuts 33, which engage the outer extremities of the two sections. By the use of these nuts the sockets may be shifted to occupy any desired position upon the rod, while lost motion, or wear between the wrist pins and the socket sections, may be taken up or overcome by shortening the engaging extremities of parts 30ª and then adjusting the nuts 33 to bring the sections together. It will thus be seen that by movement of lever 25 shaft 23 is rocked and the brake operated, being applied by moving the lever in one direction, and released by moving it in the opposite direction. Lever 25 is provided with a vertically movable frame 35, to which is secured a detachable locking plate 35ª adapted to engage the segmental rack 36 suitably mounted upon the framework of the machine. The sliding frame is moved upon the lever by the use of a spring actuated rod 37 and a movable hand piece 38 suitably pivoted to the lever arm.

From an examination of the drawings it will be observed that each pitman 13 is connected with its crank arm 14 by a socket joint 30 of the same construction as shown in Fig. 17ª and heretofore described with reference to pitman 29. The upper extremity of arm 14 is forked and provided with wrists 14ª, which enter the recesses 31 on either side of the pitman 13. Figs. 17ª, 18 and 19 show this construction.

The brake is operated by shifting lever 25 in the one or other direction according as it is necessary to apply or release the brake strap. As the brake is applied arm 17 moves toward the flange 7 of the drum and forces the strap thereagainst, thus having an important advantage over those constructions where the corresponding extremity of the strap is either immovable or drawn away from the drum. Lever 25ª is employed in shifting the center of the drum in throwing the mechanism in and out of gear.

Having thus described my invention, what I claim is—

The combination, with a drum, of a brake band fitting on the drum, a stationary shaft at the rear of the drum, arms mounted to rock upon said shaft and having pivotal means for attachment to the rear end of the band, a shaft at the front of the drum, and arms thereupon having pivotal attachment with the front end of the band, a rock shaft, a lever mounted thereupon, and means connecting said lever and the last-mentioned arms, substantially as set forth.

In testimony whereof I affix my signature in presence of two witnesses.

HENRY BOLTHOFF.

Witnesses:
WM. MCCONNELL,
MURIEL STRODE.